Aug. 12, 1958  A. GREENFIELD  2,847,161
COUNTING CIRCUIT
Filed Feb. 21, 1951
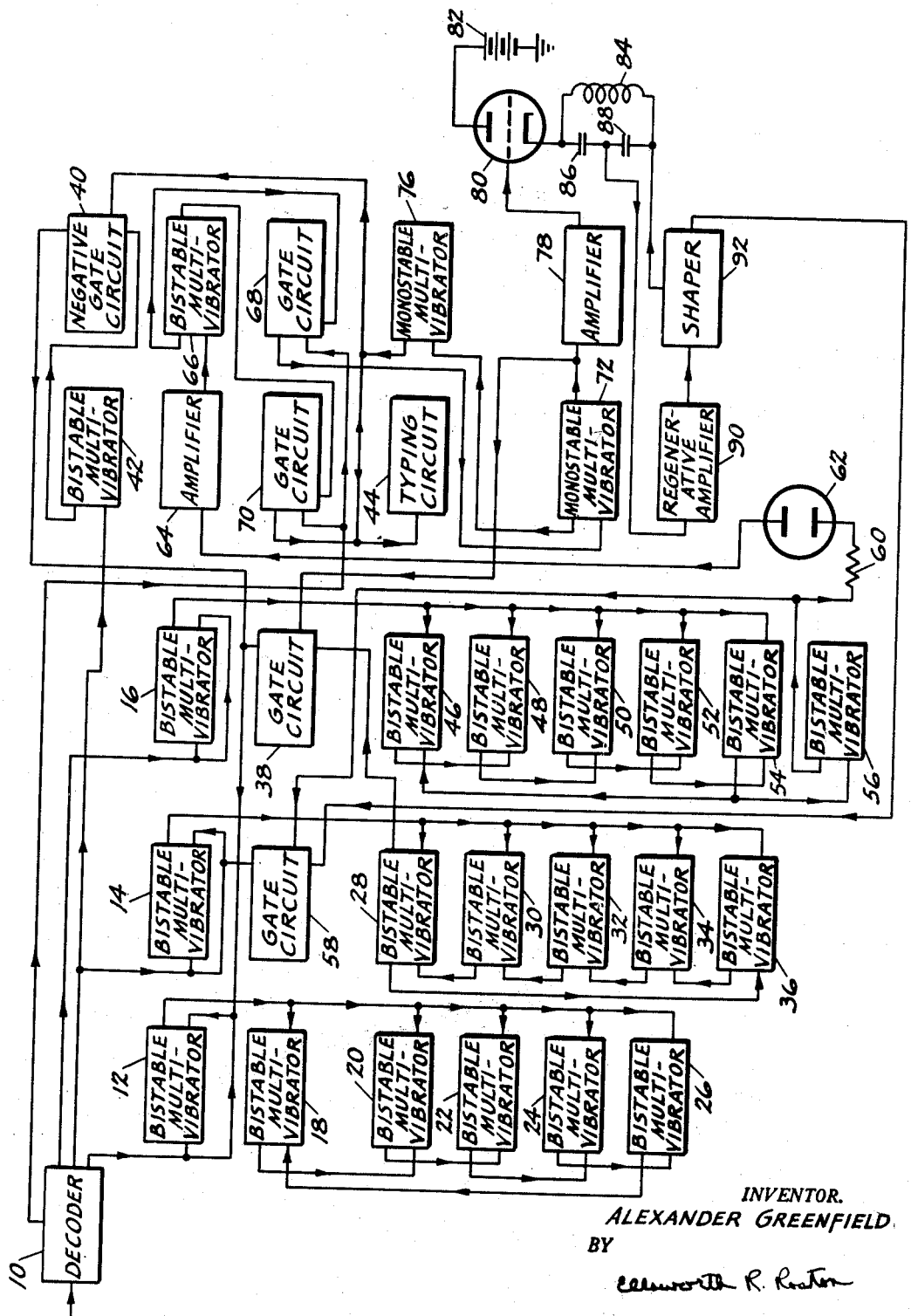
INVENTOR.
ALEXANDER GREENFIELD
BY
[signature]
ATTORNEY

United States Patent Office 2,847,161
Patented Aug. 12, 1958

2,847,161

COUNTING CIRCUIT

Alexander Greenfield, Detroit, Mich., assignor to Bendix Aviation Corporation, Detroit, Mich., a corporation of Delaware Application February 21, 1951, Serial No. 212,108

10 Claims. (Cl. 235—92)

This invention relates to a counting circuit and more particularly to a circuit for converting decimally inverse indications of a number into true numerical values.

In U. S. Patent No. 2,631,778, issued March 17, 1953, to Charles A. Piper and Lowell R. Brown, a system has been disclosed for measuring a variable quantity such as temperature or pressure and for separating the various digits in the measurement. In one embodiment of the invention disclosed in the co-pending application, voltages are produced which are proportional to the values of a first plurality of digits and proportional to the decimal complements of a second plurality of digits which have alternate positions in the measurement relative to the first plurality. For example, with a temperature measurment of 368° K., three voltages of 3, 4 and 8 volts are respectively produced and with a measurement of 236° K., voltages of 2, 7 and 6 volts are produced.

The various voltages which are produced are converted into a sequence of pulses spaced by time periods proportional to the voltages and the pulse sequence is transmitted to a central station for decoding, recording and analysis, as disclosed in U. S. Patent No. 2,717,370, issued September 6, 1955, to Charles A. Piper. With each integer in a numerical value represented by a 30 microsecond interval, a period of 90 microseconds corresponding to the value 3 in a measurement of 368° K., may be provided between a starting pulse and the first information pulse. Similarly, intervals of 120 and 240 microseconds, corresponding to the values 4 and 8, may be provided between the first and second pulses and between the second and third pulses, respectively.

This invention provides a circuit to be used at the central station for determining the number of 30 microsecond intervals between each pair of pulses in a pulse sequence and for translating such determinations into indications of the digital values comprising the transmitted measurement. The circuit operates to provide a direct indication of the value of every digit, including those digits whose values were decimally inverted before transmission to the ground station. The circuit also provides for all contingencies resulting from the inversion of alternate digits, such as problems of carrying over an integer into one digit upon a full decimal count of 10 in a second digit.

An object of this invention is to provide a circuit for indicating the values of a plurality of digits.

Another object of the invention is to provide a circuit of the above character for inverting the values of alternate digits in a digital sequence.

A further object is to provide a circuit of the above character for carrying over an integer into one digit upon a full decimal count of 10 in a second digit.

Still another object is to provide a circuit of the above character for preventing the release to recording apparatus, such as a typewriter, of numerical information relating to a plurality of digits until the information has been counted and all carry-over operations have been completed.

A still further object is to provide a circuit of the above character for giving a reliable indication of the values of a plurality of digits for all possible combinations of digital values.

Other objects and advantages will be apparent from a detailed description of the invention and from the appended drawings and claims.

The single figure is a circuit diagram, essentially in block form, of one embodiment of the invention.

In one embodiment of the invention, a decoder 10 similar to that disclosed in U. S. Patent No. 2,714,658, issued August 2, 1955, to Alexander Greenfield is provided. The decoder has a plurality of output leads which are connected to the grids of the two tubes in bistable multivibrators 12, 14 and 16. The construction and operation of bistable multivibrators, such as the multivibrators 12, 14 and 16, are fully disclosed on pages 164 to 166, inclusive, of volume 19, entitled "Waveforms," of the Radiation Laboratory Series, published by the Massachusetts Institute of Technology.

The plate of the right tube in the multivibrator 12 is connected to the grids of the right tubes in bistable multivibrators 18, 20, 22, 24 and 26. The plates of the left tubes in the multivibrators 18, 20, 22 and 24 are connected to the grids of the left tubes in the multivibrators 20, 22, 24 and 26, respectively, and the plate of the left tube in the multivibrator 26 is connected to the grid of the left tube in the multivibrator 18.

The plate of the right tube in the multivibrator 14 is connected to the grids of the right tubes in bistable multivibrators 28, 30, 32, 34 and 36. Connections are made from the plates of the left tubes in the multivibrators 30, 32, 34 and 36 to the grids of the left tubes in the multivibrators 28, 30, 32 and 34,, respectively, and from the plate of the left tube in the multivibrator 28 to the grid of the left tube in the multivibrator 36. The plate of the right tube in the multivibrator 28 is connected to the control grid of the pentode in a gate circuit 38, the plate of the pentode in the gate circuit 38 being connected to the grids of the two tubes in the multivibrator 12. The construction and operation of gate circuits similar to the gate circuit 38 are fully disclosed on pages 364 to 384, inclusive, of volume 19, entitled "Waveforms," of the Radiation Laboratory Series, published by the Massachusetts Institute of Technology.

In addition to being connected to the decoder 10, the grids of the two tubes in the multivibrator 12 are connected to the plate of the pentode in a gate circuit 40 and the grids of the two tubes in the multivibrator 14 are connected to the grid of the left tube in a bistable multivibrator 42. Connections are made from the control grid of the pentode in the gate circuit 40 to the plate of the left tube in the multivibrator 42 and from the suppressor grid of the pentode in the gate circuit 40 to the input terminal of a typing circuit 44. The construction and operation of a circuit for use as the typing circuit 44 are fully disclosed in co-pending application Serial No. 212,294, filed May 12, 1952, by Alexander Greenfield.

Similarly, the plate of the right tube in the multivibrator 16 is connected to the grids of the right tubes in bistable multivibrators 46, 48, 50, 52 and 54. The plates of the left tubes in multivibrators 46, 48, 50 and 52 are connected to the grids of the left tubes in the multivibrators 48, 50, 52 and 54, respectively. The plate of the left tube in the multivibrator 54 is connected to the grid of the left tube in the bistable multivibrator 46 as well as to the grid of the left tube in a bistable multivibrator 56.

The plate of the left tube in the multivibrator 56 is connected to the suppressor grid of the pentode in a gate circuit 58 and through a resistance 60 to one element of a neon tube 62, the other element of the neon tube being connected to the input terminal of an amplifier 64. The output from the amplifier 64 is introduced to the grid of the left tube in a bistable multivibrator 66, and the outputs from the left and right tubes in the multivibrator 66 are in turn introduced to the control grids of the pentodes in gate circuits 68 and 70, respectively. The suppressor grids of the pentodes in the gate circuits 68 and 70 are connected to an output terminal of the decoder 10, and the plates of the pentodes are connected to the grid of the left tube in a monostable multivibrator 72 and to the input terminal of the typing circuit 44. The construction and operation of monostable multivibrators similar to the multivibrator 72 are fully disclosed on pages 166 to 171, inclusive, of volume 19, entitled "Waveforms," of the Radiation Laboratory Series, published by the Massachusetts Institute of Technology.

Connections are made from the plate of the left tube in the multivibrator 72 to the grid of the left tube in a monostable multivibrator 76 and from the plate of the right tube in the multivibrator 76 to the input terminal of the typing circuit 44. The plate of the right tube in the multivibrator 72 is connected to the suppressor grid of the pentode in the gate circuit 38 and to the input terminal of an amplifier 78. The output from the amplifier is introduced to the grid of a tube 80.

The plate of the tube 80 is connected to a grounded direct power supply, such as a battery 82, and the cathode is connected to an inductance 84 and a capacitance 86, which is in series with a capacitance 88. The inductance 84 forms a parallel resonant circuit with the branch formed by the capacitances 86 and 88. The input terminal of a regenerative amplifier 90 is connected to the common terminal between the capacitances 86 and 88, and the output terminal of the amplifier 90 is connected to a shaper 92. The construction and operation of regenerative amplifiers similar to the amplifier 90 and of shapers similar to the shaper 92 are respectively disclosed on pages 329 to 333, inclusive, and on pages 597 to 599, inclusive, of "Radio Engineering," by Professor Frederick E. Terman (3rd edition, 1947). Connections from output terminals of the shaper 92 are made to the common terminal between the inductance 84 and capacitance 88 and to the control grid of the pentode in the gate circuit 58, the plate of which is connected to the grids of the tubes in the multivibrator 14.

As disclosed in the above mentioned U. S. Patents 2,631,778 and 2,717,370, a plurality of pulses separated by periods of time dependent upon the values of the different digits in a measurement are transmitted to a central station for decoding, recording and analysis. The periods of time may be proportional to the values of some of the digits and proportional to the decimal complements of other digits having alternate positions in the measurement relative to the first group of digits. For example, with a temperature measurement of 368° K., four pulses separated from one another by 90, 120 and 240 microsecond periods, respectively, may be transmitted to the central station if each integer in a number is represented by a 30 microsecond interval.

After receiving the pulses, the apparatus at the central station produces a plurality of channels each of which is activated for a period of time substantially equal to the period of time between a different pair of successive pulses. The apparatus at the central station, and particularly the decoder 10, also produces a negative signal at every 30 microsecond interval in each time period. Thus, when four pulses are received at successive periods of 90, 120 and 240 microseconds, three channels are provided with 3, 4 and 8 equally spaced signals being produced in a different one of the three channels. The signals in the different channels are respectively introduced to the multivibrators 12, 14 and 16.

The right tube in the multivibrator 12 is normally conducting, but the first negative timing signal from the decoder 10 cuts off the tube. Since the plate of each tube in the multivibrator is capacitively coupled to the grid of the other tube, the rise in voltage on the plate of the right multivibrator tube when the tube becomes cut off produces a conduction through the left tube in the multivibrator. Similarly, the second negative signal cuts off the left tube in the multivibrator and causes the right tube to start conducting. In this way, the right tube in the multivibrator conducts upon the introduction of alternate negative timing signals and during each conduction period produces a negative pulse on its plate.

The first negative pulse produced on the plate of the right tube in the multivibrator 12 upon the introduction of the second negative timing signal cuts off the right tube in the multivibrator 18 which is normally conducting. The resultant negative pulse on the plate of the left tube in the multivibrator 18 cuts off the left tube in the multivibrator 20, which is normally conducting. The right tube in the multivibrator 20 then conducts until a negative pulse is produced on the plate of the right tube in the multivibrator 12 upon the introduction of the fourth negative timing signal. The left tube in the multivibrator 22 then becomes cut off and the right tube conducts until the introduction of the sixth negative timing signal. Thus, each of the multivibrators 18, 20, 22, 24 and 26 provides an indication of a successive pair of integers.

The multivibrators 46, 48, 50, 52 and 54 operate in a similar manner to the multivibrators 18, 20, 22, 24 and 26. However, the multivibrators 28, 30, 32, 34 and 36 operate on a compensatory basis to decimally invert the number of signals introduced to the channel formed by the multivibrators, thereby providing a direct indication of the true digital value. For example, if four timing signals are introduced to the channel, the multivibrators 36 and 34 operate in sequence to provide a relatively high voltage on the plate of the left tube in the multivibrator 32, which is normally conducting. This high voltage and a relatively high voltage on the plate of the left tube in the multivibrator 14 provide in combination an indication that the true digital value in the channel is 6.

Upon a full count of 10 in the third channel, the left tube in the multivibrator 54 produces a negative pulse which triggers the left tube in the multivibrator 46 to initiate a new count. The negative pulse on the plate of the left tube in the multivibrator 54 also cuts off the left tube in the multivibrator 56 and causes a positive pulse to be produced on the plate of the tube. This positive pulse breaks down the neon bulb 62, which is normally non-conductive, and becomes negative upon passing through the amplifier 64. The negative pulse from the amplifier 64 cuts off the left tube in the multivibrator 66, which is normally conducting, to produce a positive pulse on the plate.

The positive pulse on the plate of the left tube in the multivibrator 66 is formed substantially at the same time that the last negative timing signal from the decoder 10 is introduced to the channel formed by the multivibrators 16, 46, 48, 50, 52 and 54. At this instant, the decoder 10 also forms a positive pulse. Because of the bias furnished by the positive pulse from the plate of the left tube in the multivibrator 66, the positive pulse from the decoder 10 passes through the gate circuit 68 and appears as a negative pulse on the plate of the pentode in the gate circuit. This pulse cuts off the normally conductive left tube in the multivibrator 72 and causes a negative pulse to be introduced to the amplifier 78 from the plate of the right tube in the multivibrator.

The negative pulse from the right tube in the multivibrator 72 is inverted by the amplifier 78 and introduced to the grid of the tube 80, which is normally cut off. Current then flows through the tube and produces oscillations in the resonant circuit formed by the inductance 84 and the capacitances 86 and 88. These oscillations are reinforced in amplitude by the amplifier 90 and the shaper 92, which converts the signals into a rectangular shape to facilitate their passage through subsequent gate circuits, as will be disclosed in detail hereafter.

Since the multivibrator 72 is monostable, its left tube is cut off only for a period of time determined by the multivibrator parameters. When the left tube starts to conduct, the positive pulse produced on the plate of the right tube in the multivibrator, upon being inverted, cuts off the tube 80 and prevents any further oscillations from taking place in the resonant circuit. In this embodiment, the period of operation of the multivibrator 72 is adjusted relative to the resonant frequency of the circuit formed by the inductance 84 and capacitances 86 and 88 such that nine signal cycles are produced by the resonant circuit.

After being squared by the shaper 92, the nine oscillatory signals are introduced to the control grid of the pentode in the gate circuit 58. Since the voltage on the suppressor grid of the pentode in the gate circuit 58 is high because of the positive pulse from the plate of the left tube in the multivibrator 56, the nine signals pass through the gate circuit 58 and trigger the multivibrator 14. Because of the decimal inversion which takes place in the second channel, the introduction of nine signals actually represents an increase of one integer in the number indicated by the multivibrators in the channel. For example, if the left tubes in the multivibrators 14 and 30 are cut off, an indication of the integer 4 is provided. By adding nine signals into the channel, the right tube in the multivibrator 14 and the left tube in the multivibrator 32 become cut off, corresponding to the integer 5.

Addition of an integer to the number indicated by the multivibrators in the second channel upon a full count in the third channel is necessary because of the decimal inversion of alternate digits before transmission to the central station. For example, because of the decimal inversion, sequential transmission of the numbers 1, 7 and 9 actually represents a measurement of 139. If the sequentially transmitted integers change to 1, 7 and 10, the actual measurement is 140. Thus, a full count in the third channel necessitates the subtraction of an integer from the transmitted number in the second channel to make the decimal inversion of the number in the second channel correct.

During the carry over of signals into the second channel because of a full count in the third channel, a negative pulse is produced on the plate of the right tube in the multivibrator 72, as disclosed above. This negative pulse is introduced to the control grid of the pentode in the gate circuit 38 to prevent the passage of any signals through the gate circuit. Since the grids of the two tubes in the multivibrator 12 are connected to the output terminal of the gate circuit 38, no carry over signals can be introduced from the second channel to the first channel during the addition of the nine signals to the second channel. Such blocking action is necessary during this time because the second channel may pass through a condition of full count of 10 without any intention of carrying over a signal into the first channel.

After the carry over operation from the third to the second channel has been completed, the monostable multivibrator 72 trips back to its normal condition of conduction through the left tube and causes a negative pulse to appear on the plate of the tube. At the same time, a positive pulse appears on the plate of the right tube in the multivibrator 72 and this pulse produces a positive bias on the suppressor grid of the pentode in the gate circuit 38. Thus, if a total of ten signals has been introduced to the second channel after the passage of the nine signals from the shaper 92, a positive pulse is produced on the plate of the right tube in the multivibrator 28 and this pulse is passed through the gate circuit 38 to trigger the multivibrator 12. By triggering the multivibrator 12, the count in the first channel is increased by an integer.

The negative pulse produced on the plate of the left tube in the multivibrator 72 after the passage of the nine oscillatory signals through the shaper 92 cuts off the left tube in the monostable multivibrator 76. The right tube in the multivibrator 76 then conducts for a relatively short period of time before the multivibrator reverts to its normal condition of conduction through the left tube. When the left tube in the multivibrator 76 again starts to conduct, the negative pulse on its plate operates the typing circuit 44 so that the information in each of the channels may be typed in sequence. The short conduction period of the right tube in the multivibrator 76 provides a delay for the completion of any carry over operations to the second channel upon a full count of 10 in the third channel and to the first channel upon a full count in the second channel.

In case the third channel does not have a full count, the multivibrator 56 is not operated. The positive pulse on the plate of the right tube in the multivibrator 66 therefore continues and this pulse opens the gate circuit 70 for the passage of the positive pulse which is produced in the decoder 10 at the same instant as the last negative timing signal. The pulse passing through the gate circuit 70 prepares the typing circuit 44 for operation.

As disclosed above, when ten timing signals have passed into the second channel, the multivibrator 28 closes the gate circuit 38 for the introduction of a carry over signal to the multivibrator 12. Sometimes, however, a number such as 109 is transmitted, corresponding to an actual value of 209 upon the decimal inversion of the second digit at the central station. In such a case, a positive pulse cannot be produced on the plate of the right tube in the multivibrator 28 since no triggering signals pass into the second channel. The multivibrator 42 and gate circuit 40 then operate to provide a carry over from the second channel into the first channel.

The left tube in the multivibrator 42 is normally conducting, as is the pentode in the gate circuit 40. Upon the introduction of a negative timing signal into the second channel, the left tube in the multivibrator 42 becomes cut off and a positive pulse is produced on its plate. Since a positive pulse cannot produce any change in the current flowing through the gate circuit 40, no change in voltage is produced on the plate of the pentode in the gate circuit. If no timing signal passes into the second channel, however, the left tube in the multivibrator 42 continues to conduct and a negative pulse continues to appear on its plate. The pentode in the gate circuit 40 then becomes cut off when a negative pulse is introduced to the typing circuit 44 to operate the typewriter. When the pentode in the gate circuit 40 becomes cut off, a signal is produced to trigger the multivibrator 12 and thereby increase the count in the first channel by an integer.

The counting circuit disclosed above has several important advantages. The circuit converts a plurality of timing signals representing each digit in a numerical sequence into a form which can be easily stored until the counting operation has been completed. It provides an accurate indication of the value of each digit in the sequence when alternate digits have to be indicated directly and the other digits have to be decimally inverted for a correct indication. In counting and storing the signals, the circuit operates reliably for all possible combinations of digital values.

Although the invention has been disclosed with reference to three counters, it should be appreciated that it can be easily extended to a considerably larger number of counters. In this extended number, alternate counters would count in a manner similar to that formed by the multivibrators 12, 18, 20, 22, 24 and 26, and the other counters would count in a manner similar to that formed by the counters 14, 28, 30, 32, 34 and 36.

Although this invention has been disclosed and illustrated with reference to particular applications, the principles involved are susceptible of numerous other applications which will be apparent to persons skilled in the art. The invention is, therefore to be limited only as indicated by the scope of the appended claims.

What is claimed is:

1. In combination, a plurality of successively disposed first counters for counting signals in each of a plurality of first channels, a plurality of second counters disposed between successive pairs of first counters for counting the decimal complement of signals in a plurality of second channels alternate to the first channels, means operative upon a full decimal count in each second counter to provide a positive carry over into the preceding first counter, and means operative upon a full decimal count in each first counter to provide an equivalent negative carry over into the preceding second counter.

2. In combination, a plurality of successively disposed first counters for counting signals in each of a plurality of first channels, a plurality of second counters disposed between successive pairs of first counters for counting the decimal complement of signals in a plurality of second channels alternate to the first channels, means for converting a full decimal count in each second counter into a signal operative upon the preceding first counter, and means for converting a full decimal count in each first counter into a predetermined number of signals operative upon the preceding second counter.

3. In combination, a plurality of successively disposed first counters for counting signals in each of a plurality of first channels, a plurality of second counters disposed between successive pairs of first counters for counting the decimal complement of signals in a plurality of second channels alternate to the first channels, means for converting a full count of signals in each first counter into a predetermined number of signals operative upon the preceding second counter, means for converting a full count of signals in each second counter into a signal operative upon the preceding first counter, and means operative upon the introduction of no signals into a second counter to introduce a signal to the successive first counter.

4. In combination, a plurality of successively disposed first counters for counting signals in each of a plurality of first channels, a plurality of second counters disposed between successive pairs of first counters for counting the decimal complement of signals in a plurality of second channels alternate to the first channels, means for converting a full decimal count in each second counter into a signal operative upon the counter in the preceding first counter, means for converting a full decimal count in each first counter into a predetermined number of signals operative upon the preceding second counter, and means for blocking any further carry over during the counting of the predetermined number of carry over signals in a second counter.

5. In combination, a plurality of successively disposed first counters for counting signals in each of a plurality of first channels, a plurality of second counters disposed between successive pairs of first counters for counting the decimal complement of signals in a plurality of second channels alternate to the first channels, means for converting a full decimal count in each second counter into a signal operative upon the preceding first counter, means for converting a full decimal count in each first counter into a predetermined number of signals operative upon the preceding second counter, means for blocking any further carry over during the counting of the predetermined number of carry over signals in the second counters, and means for converting a full decimal count in the second counter after the introduction of a predetermined number of carry over signals into a signal operative upon the preceding first counter.

6. In combination, a plurality of successively disposed first counters for counting the signals in each of a plurality of first channels, a plurality of second counters disposed between successive pairs of first counters for counting the decimal complement of signals in a plurality of second channels alternate to the first channels, means operative upon a full count in each of the second counters to increase the count in the preceding first counters by the introduction of a signal, means operative upon a full count in each of the first counters to increase the count in the preceding second counters by the introduction of a predetermined number of signals, means for blocking the introduction of any signals from a second counter to a first counter during the introduction of the predetermined number of signals to the second counter, means operative upon a full count in a second counter after the introduction of the predetermined number of signals to increase the count in the preceding first counter by the introduction of a signal, and means for typing the information upon the completion of the counting operations.

7. In combination, first and third counters for providing a direct indication of the first and third digits in a numerical sequence, a second counter connected to provide a decimally inverse indication of the second digit in the sequence, means operative upon a full decimal count in the third counter to close the first counter to any further count, and means operative upon the closure of the first counter to supplement the indication in the second counter by a predetermined number of signals.

8. In combination, first and third counters for providing direct indications of the first and third digits in a numerical sequence, a second counter connected to provide a decimally inverse indication of the second digit in the sequence, means operative upon a full count of signals in the third counter to supplement the indication in the second counter by a predetermined number of signals, means operative upon a full count of signals in the second counter after any carry over from the third counter to supplement the indication in the first counter by a predetermined number of signals, and means operative upon the introduction of no signals to the second counter to supplement the indication in the first counter just as if a full count existed in the second counter.

9. In combination, first and third counters for providing direct indications of the first and third digits in a numerical sequence, a second counter connected to provide a decimally inverse indication of the second digit in the sequence, means including a first multivibrator and a gate circuit for closing the first counter to any further count upon a full decimal count in the third counter, oscillatory means for providing a predetermined number of signals for supplementation of the indication in the second counter upon a full decimal count in the third counter, and means including a second multivibrator and the gate circuit for providing an auxiliary circuit to the first counter for supplementation of the count in the first counter upon a full count in the second counter after the operation of the oscillatory means.

10. In combination, first and third counters for providing direct indications of the first and third digits in a numerical sequence, a second counter connected to provide a decimally inverse indication of the second digit in the sequence, the second counter being operative upon a full count to convert its count into a supplementation of the count in the first counter, control means operative upon a full count in the third counter to prevent any action by the first counter on numerical values, oscillatory means operative by the control means to provide a predetermined number of signals for introduction to the second counter, and means including a gate circuit operative upon a full count in the second counter after the introduction of the predetermined number of signals to provide a by-pass to the first counter so that the count in the second counter may be converted into a supplementation of the count in the first counter.

References Cited in the file of this patent

UNITED STATES PATENTS

| | | |
|---|---|---|
| 2,402,988 | Dickinson | July 2, 1946 |
| 2,528,394 | Sharpless et al. | Oct. 31, 1950 |
| 2,538,122 | Potter | Jan. 16, 1951 |
| 2,669,388 | Fox | Feb. 16, 1954 |